No. 755,265. PATENTED MAR. 22, 1904.
F. WILKE.
AUTOMATIC GAS VALVE.
APPLICATION FILED JUNE 30, 1903.
NO MODEL.
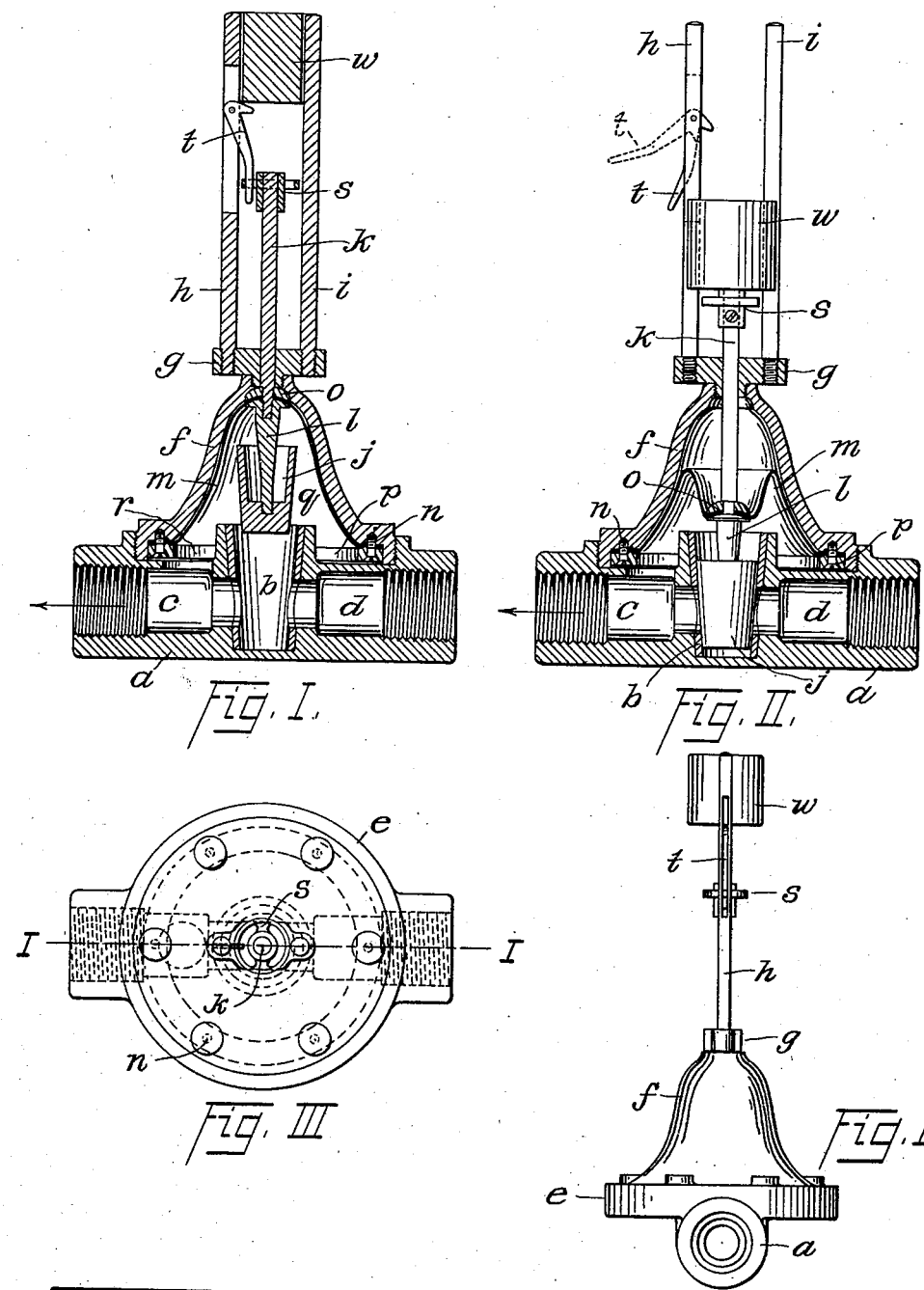
Witnesses:
F. C. Valentine
John T. Sullivan
Inventor,
Ferdinand Wilke,
by Luther G. Hopper,
Attorney.

No. 755,265. Patented March 22, 1904.

UNITED STATES PATENT OFFICE.

FERDINAND WILKE, OF AKRON, OHIO, ASSIGNOR OF ONE-HALF TO WILLIAM CHAMP LILLY, OF AKRON, OHIO.

AUTOMATIC GAS-VALVE.

SPECIFICATION forming part of Letters Patent No. 755,265, dated March 22, 1904.

Application filed June 30, 1903. Serial No. 163,731. (No model.)

*To all whom it may concern:*

Be it known that I, FERDINAND WILKE, a citizen of the United States, residing at Akron, in the county of Summit and State of Ohio, have invented certain new and useful Improvements in Automatic Gas-Valves, of which the following is a specification.

This invention relates to self-closing valves, and has for its object the provision of a valve which will close automatically when the pressure of gas or other fluid passing therethrough falls to a predetermined minimum degree.

Further objects are to provide such a valve in a simple and practicable form which can be depended upon to operate properly under any reasonable conditions of service, which will not become unreliable through the effects of corrosion or deposits of dirt or gummy substances upon its parts, which is simple to reset and adjust, and which will not leak.

To these ends my invention consists in the novel features and combinations hereinafter described and claimed, an embodiment thereof being illustrated in the accompanying drawings, in which—

Figure I is a sectional elevation on line I I of Fig. III, showing the valve open. Fig. II is a similar section showing the valve closed, the weight, rods, and valve being shown in outside elevation. Fig. III is a plan view of the device with the weight removed. Fig. IV is an end elevation.

The reference-letter $a$ indicates the valve-shell, which is internally screw-threaded at both ends or may be flanged, if desired, in the usual way to receive the gas or other fluid-pipes. Centrally located in the shell $a$ is a thick wall, in which is a vertical tapering bore to receive the valve-seat $b$. Said bore is open at its top and closed at its bottom and may itself perform the function of a valve-seat, if desired; but I prefer to insert therein a bushing of brass or non-corrosive metal, as shown at $b$. Suitable apertures make communication between the inside of the valve-seat and the respective chambers $c$ and $d$ of the shell.

Upon the upper side of the shell is formed a circular flange $e$, which is internally screw-threaded to receive a bell-shaped cap $f$, which is made tight against leakage in the usual or any suitable way. Screw-threaded or otherwise firmly secured to the top of the cap $f$ is a guide-holder $g$, provided with two upright and parallel rods or guides $h$ and $i$.

The valve $j$ is a tapered plug, preferably made hollow, and designed to fit the seat $b$ closely when closed. The valve-stem is made in two parts, the lower part $l$ being screw-threaded or otherwise secured to the valve and provided with an enlarged or flanged and rounded upper extremity, as shown. The upper part $k$ of the valve-stem is fitted to slide loosely through an aperture in the guide-holder $g$ and is turned to a smaller diameter at its lower end to form a shoulder thereon and screw-threaded into the lower stem $l$. A loose washer $o$ is carried upon the stem $k$ against the said shoulder, having its under face concaved to fit the upper end of the stem $l$, and a diaphragm $m$, of rubber or other suitable material, having a central aperture fitting the stem $k$, is securely clamped between the washer $o$ and the stem $l$. Said diaphragm is formed to fit the inside surface of the cap $f$, and is preferably reinforced with additional thickness of material about its periphery and adjacent to its central aperture. The cap $f$ is counterbored, as shown, both to receive the washer $o$ at its top and to hold the outer edge of the diaphragm at its bottom. A ring $p$ is inserted in said bottom counterbore against the outer edge of the diaphragm, and screws $n$, passing therethrough and tapped into the cap, serve to compress and hold the peripheral edge of the diaphragm between said ring and cap. It will be observed that the valve-chamber $q$ under the diaphragm is separated from the inlet-chamber $d$ when the valve is closed, but communicates at all times with the outlet-chamber $c$ through an aperture $r$.

Adjustably secured at $s$ upon the upper end of the stem $k$ by set-screws, as shown, or in any suitable way, is a hub provided with an encircling rim adapted to engage the long arm of a trigger $t$, said trigger being pivoted in a slot in the weight-guide $h$ and provided with a short tapered arm standing at an angle to its long arm, as shown. A weight $w$, preferably of cylindrical shape, is provided with oppositely-disposed longitudinal grooves, adapted to engage and slide upon the guides $h$ and $i$, and is normally supported by the short arm of the trigger $t$, as shown in Fig. I.

In the operation of the device the valve-shell being connected in a pipe, so that gas or other fluid under pressure flows therethrough in the direction indicated by the arrows, and the valve being raised the pressure exerted by the gas in the chamber $q$ upon the under surface of the diaphragm will hold the valve up in its open position. The trigger $t$ should then be set with its long arm engaging the rim of the trigger-holder $s$ and its short arm supporting the weight $w$, all as plainly shown in Fig. I. It will now be readily understood that so long as the pressure of gas remains above the degree for which the device is set the valve will remain open, but should the pressure fall below such predetermined point or degree the flexible diaphragm $m$ cannot sustain the weight of the valve, and the latter will descend until the trigger-holder $s$ releases the trigger $t$, whereupon the weight $w$ will swing the trigger outward, as shown in dotted lines in Fig. II, and drop with such impact upon the end of the valve-stem $k$ that the remaining pressure of gas under the diaphragm will be overcome and the valve $j$ driven into its seat with considerable force, as in Fig. II. Thus it is obvious that any dirt, gum, or corrosion which may have been deposited upon the valve or its seat or upon the movable parts of the device will not prevent the proper closing of the valve, since the momentum of the falling weight will overcome the obstructive tendency of such deposits, and it is evident that the valve will remain closed until it is desired to open and reset it.

Modifications may be made in the details of the device disclosed without departing from the spirit of my invention, provided the principles of construction set forth, respectively, in the following claims are employed.

I therefore particularly point out and distinctly claim as my invention—

1. In a gas-valve, a suitable shell provided with a valve-seat, a valve therein having a vertical stem projecting out of said shell, a diaphragm attached to and arranged to uphold the said valve-stem while the pressure of the fluid in said shell exceeds the degree to which the device is set, an unattached weight supported above and adapted to fall upon the upper end of said valve-stem, and means for supporting said weight and releasing the same when said diaphragm is somewhat depressed, substantially as set forth.

2. In a gas-valve, a shell provided with an inlet, an outlet and a valve-seat, a chamber above said valve-seat communicating with said outlet, a valve therein having a vertical stem projecting out of said chamber, a diaphragm fitted in said chamber attached to said valve-stem and adapted to uphold said valve while the fluid-pressure in said chamber exceeds the degree to which the device is set, an unattached weight supported above and adapted to fall upon the upper end of said valve-stem, and means for supporting said weight and releasing the same when said diaphragm is somewhat depressed, substantially as set forth.

3. In a gas-valve, a shell provided with an inlet, an outlet and a valve-seat, a bell-shaped chamber above said valve-seat communicating with said outlet, a valve therein having a vertical stem projecting out of said chamber, a flexible diaphragm formed to fit against the inner walls of said chamber when distended by fluid-pressure and having its center closely attached to said valve-stem, suitable means for securing the periphery of said diaphragm to the bottom of said chamber, a weight supported above said valve-stem, and means for supporting and releasing said weight when said diaphragm is somewhat depressed, substantially as set forth.

4. In a fluid-pressure valve, a shell provided with an inlet and an outlet communicating through a valve-seat, a bell-shaped chamber above said valve-seat communicating with said outlet, a valve therein formed to fit against said valve-seat, a flexible diaphragm fitted to the inner walls of said chamber when distended by fluid-pressure, and a valve-stem closely attached to the center of said diaphragm and projecting vertically out of said chamber, suitable means for securing the periphery of said diaphragm to the bottom of said chamber, a weight supported in guides above said valve-stem, and means for supporting and releasing said weight when said diaphragm is somewhat depressed, substantially as set forth.

5. In a fluid-pressure valve, a suitable shell provided with a valve-seat, a valve therein having a vertical stem projecting out of said shell, a diaphragm secured in said shell having at its center a suitable attachment to said valve-stem, a guided weight adapted to fall upon the end of said valve-stem, suitable guides for said weight, and a trigger adapted to support said weight and to release the latter upon a slight descent of said valve-stem, substantially as set forth.

6. In a fluid-pressure valve, a suitable shell provided with a valve-seat, a valve therein having a vertical stem projecting out of said shell, a diaphragm secured in said shell having at its center a suitable attachment to said valve-stem, a weight adapted to fall upon the end of said valve-stem, suitable guides for said weight, and a trigger pivoted to one of said guides having a short arm to support said weight and a long arm to engage a suitable holder upon said valve-stem, substantially as set forth.

In testimony whereof I affix my signature, in the presence of two subscribing witnesses, at Cleveland, Ohio, this 26th day of June, 1903.

FERDINAND WILKE.

Witnesses:
JNO. T. SULLIVAN,
JOHN F. STRAUSS.